United States Patent [19]

Frank et al.

[11] 4,401,693

[45] Aug. 30, 1983

[54] METHOD OF MANUFACTURING A HEAT-REFLECTING FILTER

[75] Inventors: Günter Frank; Heiner Köstlin, both of Aachen, Fed. Rep. of Germany; Leo M. Sprengers, Grobbendonk, Belgium; Ronald J. Campbell, Pennington, N.J.

[73] Assignee: U.S. Philips Corporation, New York, N.Y.

[21] Appl. No.: 321,963

[22] Filed: Nov. 16, 1981

[51] Int. Cl.$^3$ .................. G02B 1/10; G02B 5/08; G02B 5/26
[52] U.S. Cl. .................................... 427/160; 427/107
[58] Field of Search ............................. 427/107, 160

[56] References Cited

U.S. PATENT DOCUMENTS

| | | | |
|---|---|---|---|
| 3,666,534 | 5/1972 | Groth et al. | 427/106 |
| 3,920,533 | 11/1975 | Pompei | 427/160 X |
| 3,949,259 | 4/1976 | Kostlin et al. | 427/160 X |
| 4,127,789 | 11/1978 | Kostlin et al. | 427/107 X |
| 4,248,687 | 2/1981 | Fan | 427/160 X |

*Primary Examiner*—James R. Hoffman
*Attorney, Agent, or Firm*—Norman N. Spain

[57] ABSTRACT

A method of making a heat-reflecting filter consisting of a tin-doped indium oxide layer on a carrier. A tin-doped indium oxide layer is provided on a carrier by spraying a heated carrier with a solution of an indium salt and a tin salt. The layer is then reduced at 350°–400° C. by means of a gas flow of hydrogen, nitrogen together with oxygen or air.

5 Claims, No Drawings

METHOD OF MANUFACTURING A HEAT-REFLECTING FILTER

The invention relates to a method of manufacturing a heat-reflecting filter, particularly for light sources having a large share of infrared in their radiation output, in which a tin-doped layer of indium oxide is provided on a light-pervious carrier and during or after the coating process the carrier is heated at a temperature between 300° C. and the softening temperature of the carrier in a reducing atmosphere.

Such a filter, known for example from German Patent Specification No. 23 41 647, behaves with respect to electromagnetic radiation, such as visible light or infrared radiation, the wavelength of which is larger than the so-called plasma wavelength $\lambda_p$ of the material, as a metal, with respect to smaller wavelengths, however, as a dielectric, i.e. in the former spectral range thus strongly reflecting, but highly transparent in the other range. The normal band absorption of the material begins only in the near ultraviolet spectral range.

The location in the spectrum of this more or less abrupt change of the optical properties of the material, denoted as plasma edge, is determined by the density of the free electrons (charge carrier density).

Such filters may then be used advantageously when thermal radiation has either to be suppressed or to be radiated back to the source of radiation so as to increase, for example, the efficiency thereof.

Applications of such heat reflecting filters are, for example, the thermal isolation low pressure sodium discharge lamps, the reduction of the radiation losses in solar collectors, or the improvement of the thermal isolation of windows with multiple panes.

It has been found that heat reflecting filters of the said type would have to have not only a more or less high charge carrier density for the said applications but also that an mobility of the charge carriers in the filter layer should be as large as possible is desired. The mobility of the charge carriers can be determined via Hall effect measurements.

The heat filter manufactured according to the known method and having a filter layer with tin-doped indium oxide with a charge carrier density ($N_e$) of approximately $1.3 \times 10^{21}/cm^3$ has a charge carrier mobility $\mu$ of approximately 30 cm$^2$/Vs. These values are not optimum for various applications, for example for the thermal isolation of solar collectors and also for a low pressure sodium vapour discharge lamp having a particularly high efficiency.

It is known that in semiconductors the mobility of the charge carriers decreases when their density increases. In "Physikalische Blätter", 34, (1978), No. 3, pp. 106 et seq. it is demonstrated, for example, that with a charge carrier density ($N_e$) of only approximately $5 \times 10^{20}/cm^3$ a charge carrier mobility ($\mu$) of approximately 40 cm$^2$/Vs can be achieved. However, those skilled in the art cannot derive from this prepublication how, independent of the primary manufacturing process of the filter layer, for various charge carrier densities each time the optimum charge carrier mobility can be adjusted afterwards. The same applies to the value pairs of charge carrier density and charge carrier mobility of Sn-doped In$_2$O$_3$ layers, as they are described in German Patent Application No. 12 60 627.

It is the object of the invention to improve the known method of manufacturing a heat reflecting filter of tin-doped indium oxide which is highly transparent to visible radiation (light) but reflects infrared radiation in such a manner that a larger charge carrier mobility and in particular, with a given charge carrier density, an optimum value of charge carrier mobility can be adjusted.

In a method of the kind mentioned in the opening paragraph this object is achieved in that the indium oxide layer is doped with less than 7 mol.% of Sn calculated on the quantity of indium oxide, and that for the reduction a gas mixture consisting of 5 to 20% by volume of hydrogen with nitrogen as remainder at 100% by volume, while adding 0.5 to 3% of oxygen or 2.5 to 15% of air, each time calculated on the share of hydrogen, is passed over the filter layer for 10 minutes to 2 hours, which layer is present on the carrier heated at a temperature between 350° and 400° C.

According to advantageous further embodiments of the invention the indium oxide layer is doped with 0.5 to 6.5 mol.% of Sn calculated on the quantity of indium oxide and a gas mixture consisting of 5 to 20% by volume of hydrogen with nitrogen as remainder at 100% by volume while adding 1% of hydrogen or 5% of air each time related to the share of hydrogen, is passed over the filter layer for 15 to 30 minutes.

The present method shows how the charge carrier mobility in tin-doped indium oxide layers operating as heat reflection filters can be increased and in addition an optimum value of the charge carrier mobility can be adjusted each time for a given charge carrier density.

The invention is based on the recognition of the fact that immanent optical properties of the heat reflecting filters of the said type, an as large as possible permeability for the visible radiation portion and an as large as possible reflection in the range of the infrared radiation, can very variably be adjusted to any application.

In the known method of manufacturing Sn-doped In$_2$O$_3$ layers either by spraying at elevated temperature, sputtering or reactive vapour deposition, it should always be taken into account that free charge carriers are bound by excess oxygen which for the remaining free charge carriers are then also active as extra stray centres and considerably reduce the mobility thereof. This effect is surprisingly avoided by the present method.

The following example serves to illustrate the operation of the method according to the invention: An indium oxide layer is made with a doping of 2 mol % of Sn by hot spraying with an aerosol of InCl$_3$ in n.butyl acetate, doped with SnCl$_4$ at approximately 500° C. In this layer first a charge carrier density ($N_e$) of $2.2 \times 10^{20}/cm^3$ and a charge carrier mobility ($\mu$) of 40 cm$^2$/Vs are obtained. After reduction according to the invention values for the charge carrier density $N_e$ of $5.5 \times 10^{20}/cm^3$ and for the charge carrier mobility $\mu$ of 58 cm$^2$/Vs were obtained.

A further advantage obtained by means of the method according to the invention is the following: with the reduction gas mixture used it has become possible to use as a reduction gas the non-poisonous (which is an important property for a manufacturing process with a view to the operating personel) hydrogen gas which however, is difficult to control both thermodynamically and dynamically at low temperatures. As a result of the proved buffering of the hydrogen with oxygen, the reduction process according to the method of the invention can be controlled thermodynamically and dynamically in the same optimal manner as this is known of reduction processes which operate with a gas mixture of CO/CO$_2$. The decisive disadvantage for a large scale manufacture is that CO is poisonous to a considerable extent and should therefore not be used in a manufacturing plant.

In a test series with different tin dopings ($c_{Sn}$) in an indium oxide layer which was manufactured according to the method of the invention the following associated values recorded in the Table below were established of tin dopings ($c_{Sn}$), charge carrier density ($N_e$) and charge carrier mobility ($\mu$).

TABLE

| $c_{Sn}$ (mol %) | $N_e$ ($10^{20}$/cm$^3$) | $\mu$ (cm$^2$/Vs) | $\rho$ ($10^{-4}$ cm) |
|---|---|---|---|
| 0.8 | 2.5 | 70 | 3.6 |
| 2 | 5.5 | 58 | 2.0 |
| 4 | 9.5 | 46 | 1.4 |
| 6 | 13 | 38 | 1.3 |
| 9 | 14 | 34 | 1.3 |
| 12 | 13 | 27 | 1.8 |

$c_{Sn}$ = tin doping
$N_e$ = charge carrier density
$\mu$ = charge carrier mobility
$\rho$ = resistivity of the layer.

Between these values there can be interpolated with suitable formulae. The charge carrier density ($N_e$) results from $$N_e \approx 3 \cdot 10^{20} \cdot c_{Sn}(1 - c_{Sn}/100)^l \text{ cm}^{-3};$$

$l$ = between 6 and 8.
The charge carrier mobility ($\mu$) is given by $$\mu = a \cdot (N_e/10^{20})^b \text{ cm}^2/\text{Vs}$$

a = between 100 and 200
b = between $-\frac{1}{3}$ and $-\frac{2}{3}$.

Knowing this relationship makes it possible to calculate the optimum doping of an indium oxide layer for each endavoured application, in which the following train of thought is followed:

The thermal radiation to be reflected in accordance with the application, lies in very different wavelength ranges for example in the range of 5 to 50 $\mu$m at the 80° C. radiation of a solar absorber, between 3 and 30 $\mu$m at the 270° C. radiation, as it occurs, for example, in a low pressure sodium discharge lamp or between 0.5 and 5 $\mu$m at the 3000° K. radiation of an incandescent lamp.

On the other hand great transparency is desired in the visible spectral range. In this layers, materials such as tin-doped indium oxide show the transition from large transmissive power in the visible spectral range to high reflective power in the infrared at their plasma wavelength ($\lambda_p$) which is related to the charge carrier density according to $\lambda_p = 4.0/\sqrt{N_e}$ ($\lambda_p$ in $\mu$m; $N_e$ in multiples of $10^{20}$/cm$^3$). The charge carrier density must hence be chosen in accordance with the application that is to say the correct quantity of tin must be doped.

From theoretical considerations the following approximation terms arise for the losses in the visible range of the spectrum and in the infrared which are both based on absorption by the In$_2$O$_3$ layers on glass substrates:

$$A_{vis} = 1 - T_{vis} - R_{vis} \approx 0.526 \cdot \lambda^2/(n(\lambda) \cdot m^{*2}), N_e \cdot d/\mu$$

and $$A_{IR} = 1 - R_{IR} \approx 6.6 \cdot 1/(N_e \cdot d \cdot \mu)$$

wherein
$A_{vis}$ = adsorption in the visible spectral range
$A_{IR}$ = absorption in the infrared
T = transmission
R = reflection
$n(\lambda)$ = refractive index of tin-doped indium oxide at the wave length $\lambda$, $n \approx 2.0$ for $\lambda \approx 0.5$ $\mu$m
$m^* \approx 0.35$; effective mass of the free electrons in tin-doped indium oxide
d = the thickness of the layer.

The numerical values apply when $N_e$ is computed in multiples of $10^{20}$/cm$^3$, d in $\mu$m, $\mu$ in cm$^2$/Vs and $\lambda$ in $\mu$m.

The variation of the charge carrier density ($N_e$) and layer thickness (d) of the reflective filter layer has an exactly opposite effect on the losses in the two spectral ranges. So the two losses are related to each other and the following hyperbolic relation may be formulated:

$$A_{vis} \cdot A_{IR} \approx 3.5 \cdot \lambda^2/(n(\lambda) \cdot m^{*2}) \cdot 1/\mu^2.$$

From this hyperbolic relation it will be obvious that at any rate high values of the charge carrier mobility ($\mu$) keep the losses of the heat reflecting filter small. According to the above table this always means as small as possible charge carrier concentrations, which means that correspondingly small tin dopings must be chosen. This requirement hence also remains when not the same weight would be alotted to the two factors in the minimum requirement when, for example, a higher absorption would be accepted in order to obtain a better thermal reflection.

For optimising a heat reflecting filter, $N_e$ must hence be chosen to be so small as is just still compatible with the requirement that the transition from a high transmission in the visible range to a high reflecting power in the infrared lies at such a wavelength ($\lambda_p$) that the wavelength range of the thermal radiation to be reflected lies as completely as possible above $\lambda_p$.

The absolute value of the heat-reflecting power must then be influenced only with the layer thickness (d) which must be chosen as a compromise between a high value for $R_{IR}$ and a high value for $A_{vis}$ (both $\approx N_e \cdot d$), taking into account the fact that in general a transmission maximum in the visible spectral range must be expected at a wavelength which is given by $\lambda = 2nd/m$ (m = 1, 2, 3, . . .), the refractive index n of the indium oxide layer being taken again at 2.

The indicated data also makes it possible to compute the smallest layer thickness (d) with which a desired surface resistance R = $\rho$/d (in $\Omega$), for example for a transparent electrically conductive electrode, can be reached in a layer which is doped with approximately 6 to 10 mol.% of tin (with which the highest charge carrier concentration can be reached). The required layer thickness (d) then is 1.3/R$\mu$m.

According to a further advantageous embodiment of the invention, the gas mixture is passed over a catalyst which is present at the same temperature as the support.

The catalyst advantageously consists of platinum. By inserting a catalyst over which the gas mixture is passed before it reaches the In$_2$O$_3$ layer, the advantage is obtained that a layer of inhomogeneous structure can be reduced more homogeneously in the atmosphere that is buffered by the catalyst in a controlled manner and in addition that the duration of the process becomes less critical. The inhomogeneous structure of the layer to be reduced may be caused by the way of providing the layer, the morphology of the substrate surface or by a non-uniform temperature of the substrate.

For the said reduction method, a $H_2/N_2$ gas mixture must advantageously be used; however, another suitable reducing gas may also be used. The reduction process must be discontinued before the indium oxide of the layer is decomposed, that is to say is reduced to indium metal, which reduction is evidenced by a blackening of the layer.

This may be avoided in two manners: First, the reduction can be interrupted in time by cooling the layer, in which, for establishing the instant of the interruption, the electrical resistance R of the layer during the reduction is preferably measured and the oven is switched off when said resistance has reached a minimum. At this instant the layer has achieved the optimum properties: maximum charge carrier density ($N_e$) and maximum charge carrier mobility ($\mu$) which however, are different for any chosen tin doping ($c_{Sn}$), $R \approx 1/N_e d\mu$ (d=layer thickness) as appears from the above Table. When the reduction is continued, the sheet resistance again becomes larger. An over reduction occurs in which mainly the charge carrier mobility decreases. A visible dark colouring of the layer by an overreduction occurs only when the resistance has already exceeded approximately 10 to 30% above its optimum value.

The second possibility of avoiding an overreduction of the doped indium oxide layer is to buffer the reducing action of the gas mixture. A gas mixture is used which has a low partial oxygen pressure which is not substantially larger than the decomposition pressure of the indium oxide at the reduction temperature. This decomposition pressure is known from thermodynamic data.

The possibility of operating with a reducing gas, for example CO or $H_2$ buffered by $CO_2$ or $H_2O$ vapour, is known from German Patent Specification No. 2341647. It has now been found that clearly better results can be achieved as regards the mobility of the charge carriers especially also in low-doped $In_2O_3$ layers, when the reducing gas mixture in the present case $H_2/N_2$, is not buffered with $H_2O$ vapour but with oxygen, the gas mixture being passed on the layer either directly or via a catalyst preferably platinum, placed before the layer to be reduced. The catalyst must have the same temperature as the carrier on which the layer is present. The temperature at which the reduction process is to occur and at which both the support with the filter layer and the gas mixture are heated via the catalust must be kept uniform during the reduction process as much as possible for all the systems taking part in the method.

An embodiment of the invention will now be described.

3 ml of $SnCl_4$ are added to a solution of 100 g of $InCl_3$ in 1000 ml of n-butyl acetate. The solution is atomised in an atomiser jet pipe with air and the formed aerosol is passed over a flat transparent carrier, for example of glass. The carrier is heated by an oven at approximately 500° C. The aerosol jet is passed over the carrier until a layer having a thickness of approximately 0.3 $\mu$m has been deposited on it. The doping incorporated in the $In_2O_3$ layer is 6 mol.% tin calculated on the quantity of indium oxide. The covered carrier is then heated in a reactor at 350° C. A catalyst, preferably of platinum also heated at 350° C., is present in the reactor in a place which passes the reducing gas mixture to be fed into the reactor sooner than the covered carrier. The reactor has been rinsed previously with the reducing gas mixture.

The quantity of oxygen to be added to the $H_2/N_2$ gas mixture depends on the reduction temperature because the decomposition pressure of the indium oxide and the equilibrium composition of the $H_2/N_2/O_2$ gas mixture which can be calculated from known thermodynamic data, depend on the temperature.

To the reducing gas mixture of 85% of nitrogen and 15% of hydrogen, extra 2% oxygen are added calculated on the share of hydrogen. This gas mixture is passed through the reactor at normal pressure at a flow rate of 6 l per hour. The reactor with the carrier on which the filter layer is present are heated at a temperature of approximately 350° C. in approximately 30 minutes.

Although at high reduction temperature the reduction times are short, which generally is a technical advantage, the danger of a rapid overreduction when the gas composition is not accurately maintained is also large. According to experience, at lower reduction temperatures the overreduction may be avoided for a comparatively long period of time.

During cooling the indium oxide layer, either the oxygen supply must be switched off or the catalyst may not be cooled because otherwise the gas equilibrium shifts too strongly to oxygen so that the optimum reduced layers in the cooling phase oxidize partly and again lose their optimum properties, especially the large mobility of the charge carriers.

What is claimed is:

1. A method of manufacturing a heat-reflecting filter, especially for light sources having a large share of infrared, in which a tin-doped layer of indium oxide is provided on a light-pervious carrier and during or after the coating the carrier is heated at a temperature between 300° C. and the softening temperature of the carrier in a reducing atmosphere, characterized in that the indium oxide layer is doped with less than 7 mol % of tin calculated on the quantity of indium oxide and that for the reduction a gas mixture consisting of 5 to 20% by volume of hydrogen with nitrogen as remainder to 100 vol.%, with the addition of 0.5 to 3% oxygen or 2.5 to 15% air, each time calculated on the hydrogen share, is passed over the filter layer for from 10 minutes to 2 hours, which layer is present on a carrier heated at a temperature between 350° and 400° C.

2. A method as claimed in claim 1, characterized in that a gas mixture consisting of 5 to 20 vol.% of hydrogen with nitrogen as remainder to 100 vol.% with the addition of 1% of oxygen or 5% of air, each time calculated on the share of hydrogen, is passed over the filter layer for 15 to 30 minutes.

3. A method as claimed in claim 1 or claim 2, characterized in that the indium oxide layer is doped with 0.5 to 6.5 at.% of tin calculated on the quantity of indium oxide.

4. A method as claimed in claim 3, characterized in that the gas mixture is passed over a catalyst which is at the same temperature as the carrier with the indium oxide layer.

5. A method as claimed in claim 4, characterized in that a platinum catalyst is used.

* * * * *